United States Patent [19]

Riordan, III

[11] Patent Number: 5,094,802

[45] Date of Patent: Mar. 10, 1992

[54] NUCLEAR FUEL ASSEMBLY DEBRIS FILTER

[75] Inventor: John E. Riordan, III, Lynchburg, Va.

[73] Assignee: B&W Fuel Company, Lynchburg, Va.

[21] Appl. No.: 535,256

[22] Filed: Jun. 8, 1990

Related U.S. Application Data

[62] Division of Ser. No. 421,042, Oct. 13, 1989.

[51] Int. Cl.$^5$ .................. G21C 19/00; G21C 15/00; G21C 3/32
[52] U.S. Cl. .................................. 376/352; 376/313; 376/443
[58] Field of Search ................. 376/352, 446, 313, 443

[56] References Cited

U.S. PATENT DOCUMENTS

| | | | |
|---|---|---|---|
| 3,801,453 | 4/1974 | Jones | 376/446 |
| 4,420,457 | 12/1983 | Pargneux | 376/446 |
| 4,427,624 | 1/1984 | Marlatt et al. | 376/352 |
| 4,615,862 | 10/1986 | Huckestein | 376/446 |
| 4,684,495 | 8/1987 | Wilson et al. | 376/352 |
| 4,828,791 | 5/1989 | De Mario | 376/352 |
| 4,832,905 | 5/1989 | Bryan et al. | 376/352 |
| 4,900,507 | 2/1990 | Shallenberger et al. | 376/352 |

FOREIGN PATENT DOCUMENTS

| | | | |
|---|---|---|---|
| 0102493 | 8/1979 | Japan | 376/352 |
| 0162985 | 8/1985 | Japan | 376/352 |
| 2096891 | 5/1987 | Japan | 376/352 |

Primary Examiner—Harvey E. Behrend
Attorney, Agent, or Firm—Robert J. Edwards; D. Neil LaHaye

[57] ABSTRACT

A nuclear fuel assembly with a debris filter. The lower end fitting of the fuel assembly has a stamped plate attached thereto that serves as a debris filter immediately upstream of the fuel rods. The stamped plate is provided with a plurality of flow holes in a size and pattern that provides filtration of debris damaging to the fuel rods while maintaining adequate coolant flow through the fuel assembly.

1 Claim, 6 Drawing Sheets

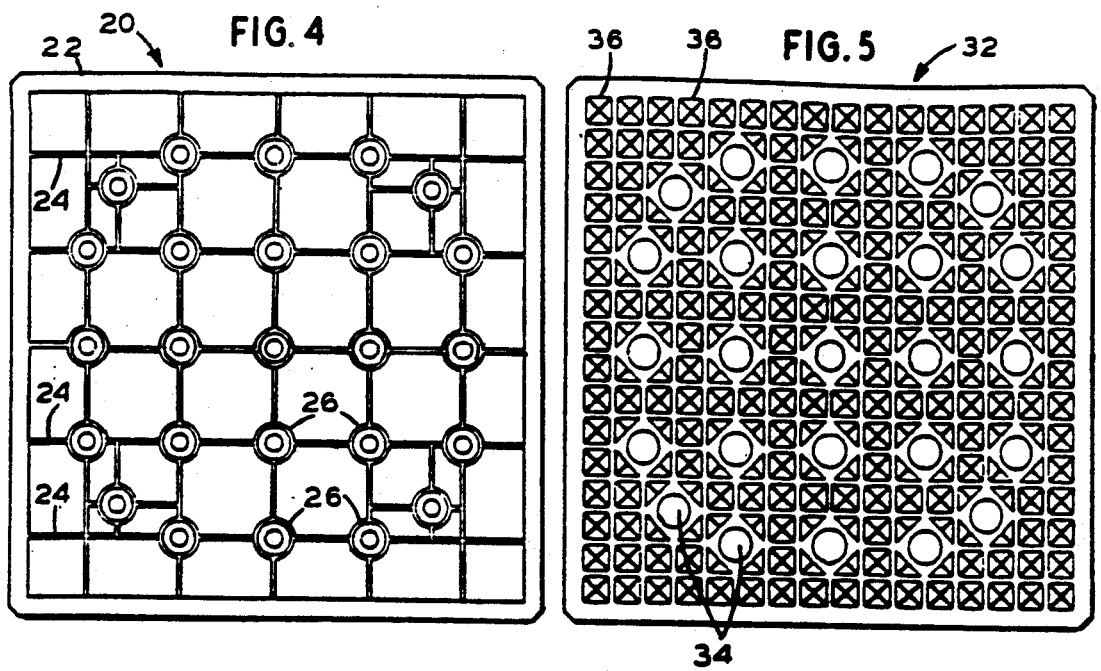
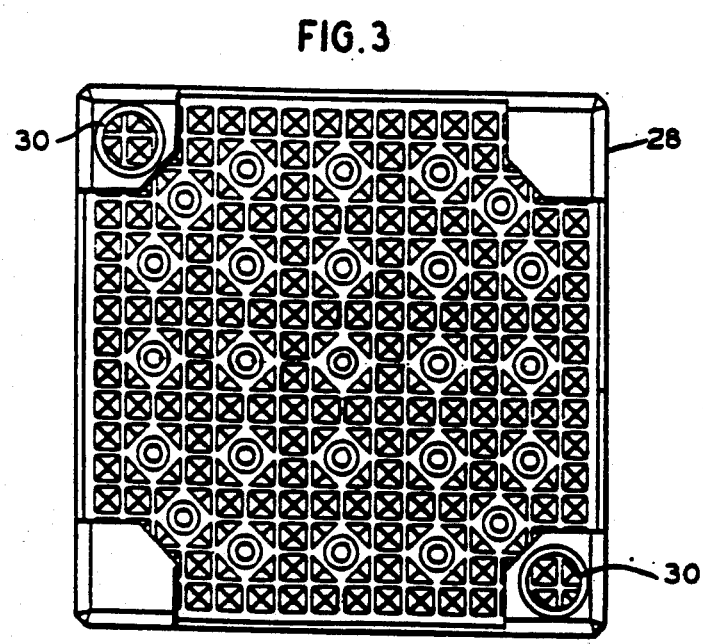
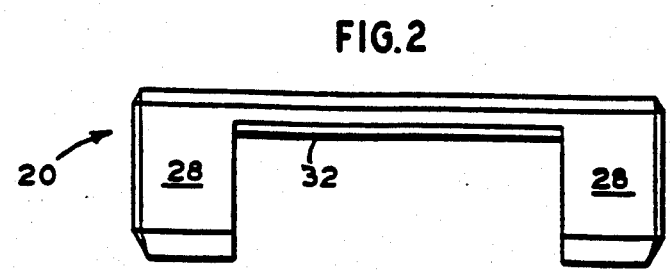

FIG. 8
FIG. 10
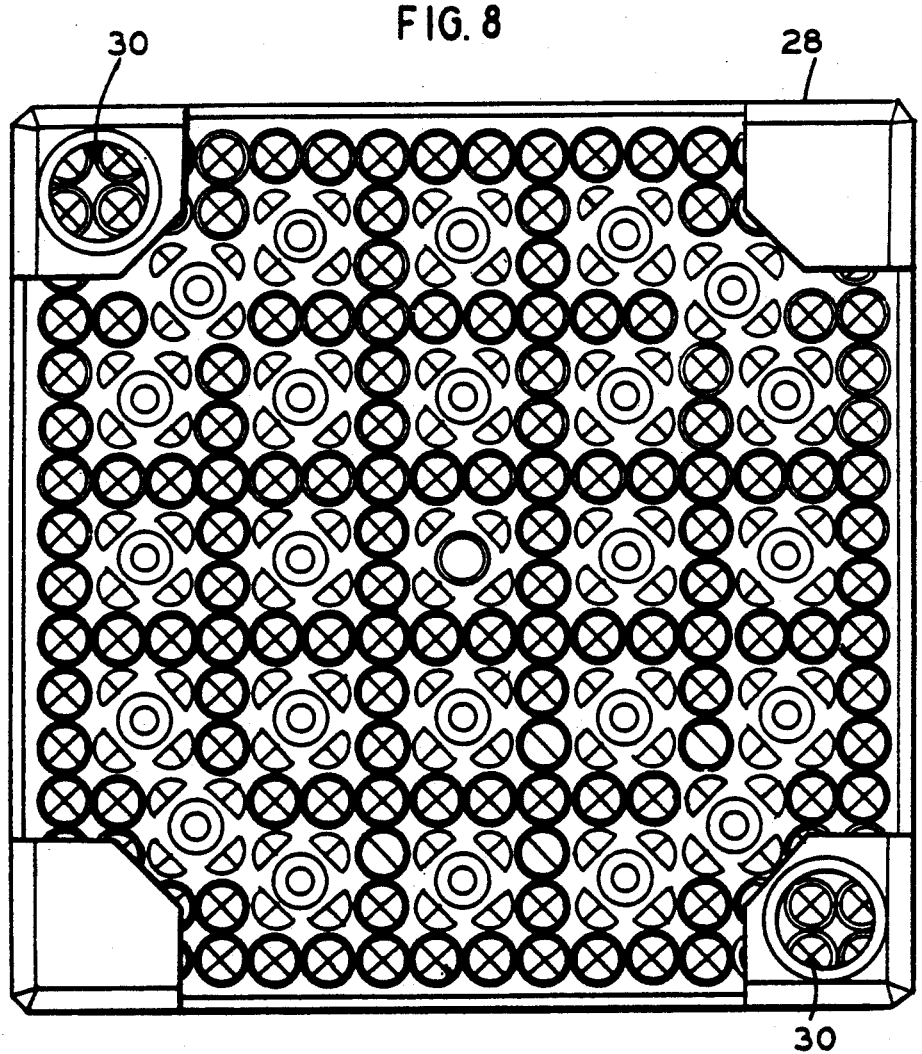
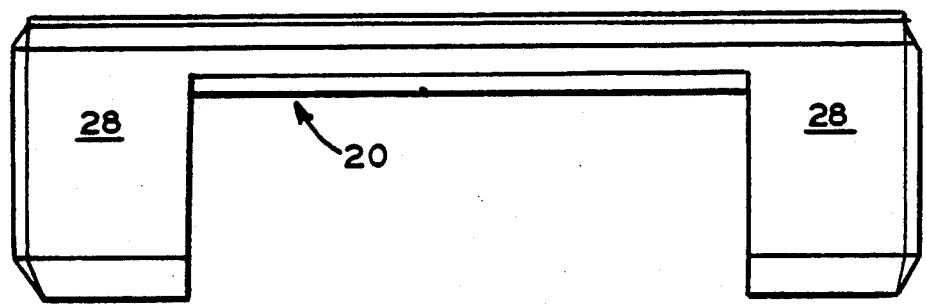

NUCLEAR FUEL ASSEMBLY DEBRIS FILTER

This application is a division of application Ser. No. 07/421,042, filed Oct. 13, 1989.

BACKGROUND OF THE INVENTION

1. Field of the Invention

The present invention is generally related to a nuclear reactor fuel assembly and in particular to a debris filter used with the fuel assembly.

2. General Background

Commercial nuclear reactors include multiple fuel assemblies. Each fuel assembly is comprised of a number of fuel rods radially spaced apart in a parallel array by grid assemblies spaced along the length of the fuel rods. Each grid assembly is formed in an eggcrate design by multiple metal strips that criss-cross at right angles to form individual cells for each of the fuel rods. The strips are provided with tabs that project into the cells against the fuel rods. The tabs serve the purposes of holding the fuel rods in their respective radial positions and providing maximum surface area contact of the fuel rods with coolant flowing through the cells. Control rod guide thimble tubes also extend through selected cells in the grid assembly and are attached at their upper and lower ends respectively to an upper end fitting and a lower end fitting. The upper and lower end fittings are also commonly referred to in the industry as nozzle plates since they are rigid plates that provide structural integrity and load bearing support to the fuel assembly and are provided with flow apertures therethrough for coolant flow. The lower end fitting or nozzle plate is positioned directly above openings in the lower portion of the reactor where coolant flows up into the reactor to the core. The ligaments between apertures in the end fittings coincide with the ends of the fuel rods and limit upward or downward movement of the fuel rods. Debris such as metal particles, chips, and turnings is generated during manufacture installation, and repair of the reactor, piping, and associated cooling equipment. The size and complexities of the equipment prevent location and removal of all such debris before operations are commenced. Also, some of this debris may not become loose matter in the system until the system is put into operation. It has bee recognized that this debris presents a greater problem to the system than previously thought. These small pieces of debris have been found to lodge between the walls of the grid cells and the fuel elements. Movement and vibration of the lodged debris caused by coolant flow results in abrasion and removal of cladding on the fuel rods. This in turn leads to detrimental effects such as corrosion of the fuel rods and failure to retain radioactive fission gas products. Such damage, although not critical to safety of the surrounding environment, can reduce operating efficiency by the need to suspend operation while replacing damaged fuel rods. It can be seen that a need exists for a debris filter capable of filtering debris of a size which may lodge between the grid cell walls and the fuel rods. An important consideration besides that of filtration is that a substantial coolant pressure drop across the filter must be avoided in order to maintain an adequate coolant flow over the fuel rods for heat removal therefrom. Patented approaches to this problem of which applicant is aware include the following.

U.S. Pat. Nos. 4,684,495 and 4,684,496 disclose debris traps formed from a plurality of straps aligned with one another in a crisscross arrangement and defining a plurality of interconnected wall portions which form a multiplicity of small cells each having open opposite ends and a central channel for coolant flow through the trap.

U.S. Pat. No. 4,828,791 discloses a debris resistant bottom nozzle which is a substantially solid plate having cut-out regions in alignment with inlet flow holes in the lower core plate. Separate criss-cross structures fixed to the plate extend across the cut-out regions to act as a debris trap.

U.S. Pat. Nos. 4,664,880 and 4,678,627 disclose debris traps mounted within a bottom nozzle that define a hollow enclosure with an opening so as to form a debris capturing and retaining chamber.

U.S. Pat. No. 4,652,425 discloses a trap for catching debris disposed between the bottom nozzle and the bottom grid. The structure forms multiple hollow cells that receive the fuel rod lower end plugs with dimples in each cell for catching debris carried into the cells by the coolant flow.

SUMMARY OF THE INVENTION

The present invention provides a solution to the above problem in the form of a screen attached to the lower end fitting or nozzle plate. The lower end fitting is formed from a substantially square base having interconnecting ribs between the walls with openings thereon which receive control rod guide tubes. Legs extending downward from each corner support the end fitting on the lower reactor internals. A stamped screen sized to match the lower end fitting and provided with flow holes sized to filter debris is attached to the lower end fitting.

BRIEF DESCRIPTION OF THE DRAWINGS

For a further understanding of the nature and objects of the present invention reference should be had to the following description, taken in conjunction with the accompanying drawings in which like parts are given like reference numerals and, wherein:

FIG. 2 is a side view of the invention in its installed position on the lower end fitting.

FIG. 3 is a bottom view of the invention in its installed position on the lower end fitting.

FIG. 4 is a top view of a lower end fitting.

FIG. 5 is a top view of the debris filter.

FIG. 6-11 illustrate an alternate embodiment of the invention.

DETAILED DESCRIPTION OF THE PREFERRED EMBODIMENT

Figure 1:
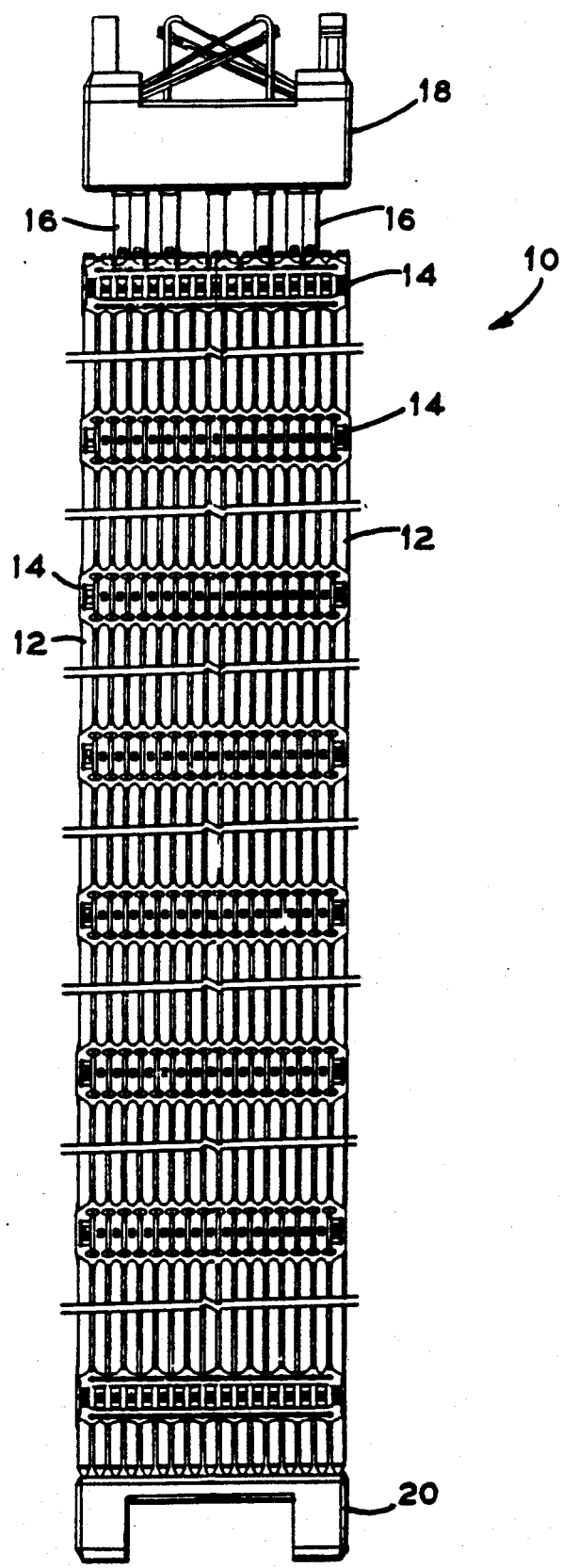
FIG. 1 is a partial sectional view of a typical fuel assembly.

Referring to the drawings, FIG. 1 is an illustration of a typical nuclear fuel assembly generally designated by the numeral 10. Fuel assembly 10 is typical of that used in a pressurized water reactor and is generally comprised of a plurality of fuel rods 12, grid assemblies 14, guide tubes 16, upper end fitting 18, and lower end fitting 20. Fuel rods 12 are maintained in an array spaced apart by grid assemblies 14. Guide tubes 16 extend through grid assemblies 14 and are attached to end fittings 18,20 and, in addition to providing structural integrity to the entire assembly, also serve as guides for control rods not shown. Upper and lower end fittings 18,20 provide structural and load bearing support to fuel assembly 10 and are also provided with openings therethrough to allow coolant to flow vertically through fuel assembly 10. Lower end fitting 20 rests on the lower core support plate (not shown) of the reactor and directly above coolant inlet openings in the core support plate that direct coolant upward to the fuel assembly. Dimples or tabs in the walls of the grid assemblies allow maximum surface area contact of fuel rods 12 with the coolant a it flows upwardly therethrough.

Lower end fitting 20, seen in FIG. 4, is formed from a substantially square base 22 having four side walls. Between the side walls, a plurality of ribs 24 are provided that interconnect, leaving the interior of base 22 substantially open to allow coolant flow therethrough. A plurality of guide tube bosses 26 are provided along ribs 24 in a pattern matching the distribution of guide tubes 16 in grid assemblies 14. Legs 28, seen in FIG. 2 and 3 may be separate parts attached to base 22 or may be integral therewith Openings 30 provided on two diagonally disposed legs 28 are used to attach lower end fitting 20 to the lower core plate to prevent movement of end fitting 20 and fuel assembly 10 during reactor operations.

Debris filter 32, seen separately in FIG. 5 and attached to lower end fitting 20 in FIG. 2 and 3, is formed from a stamped plate in the preferred embodiment for ease of manufacturing and is approximately 0.1 inch thick. The plate is stamped so as to have guide tube openings 34 in a pattern matching guide tube bosses 26 on lower end fitting 20. Triangular shaped flow holes 36 are provided in a square pattern or cluster wherein the solid portions of the plate between each cluster are substantially aligned with the ends of fuel rods 12. This provides support to fuel rods 20 when necessary due to movement and allows maximum coolant flow through flow holes 36, grid assemblies 14, and around fuel rods 20. In the preferred embodiment, each square cluster measures 0.405 inch on each side with the distance from the base of each triangular flow hole 36 to its apex adjacent the center of the square cluster being 0.181 inch. This provides a total flow area through debris filter 32 of approximately 27 square inches. In the preferred embodiment, the portions of the plate or ligaments between flow holes 36 in each square cluster is approximately 0.030 inch in width so as to provide adequate support in preventing failure of debris filter 32 during operations. The ligaments of the plate between the flow holes in each cluster are diagonally oriented relative to the sides of the plate. The diagonal orientation of the filter ligaments is such that the unblocked flow area, when considering the projected area of the fuel rods and the filter flow holes, is maximized. This minimizes pressure drop. As best seen in FIG. 3, ribs 24 in lower end fitting 20 and the solid portions of debris filter 32 between flow holes 36 are arranged in identical configurations so that ribs 24 do not interfere with coolant flow after passing through debris filter 32. Debris filter 32 may be attached to lower end fitting 20 by any suitable means such as welding.

An alternate embodiment of the invention is illustrated in FIG. 6–11. In the alternate embodiment, instead of having ribs 24 bearing guide tube bosses 26, lower end fitting 20 is formed from a plate provided with a plurality of flow holes 40. The solid portions of the plate between each cluster of flow holes 40 are substantially aligned with the ends of fuel rods 12. As seen in the bottom view of FIG. 7 and the partial side sectional view of FIG. 11, flow holes 40 are provided with a bottom chamfer as indicated by the letter A of approximately 20 degrees. Positioned around guide tube bosses 26 are semicircular flow holes 42 to provide the maximum flow area possible. The inner diameter of flow holes 40 is approximately 0.405 inch while the chamfered lower edge is approximately 0.495 inch in diameter. As seen in the bottom and side view of FIG. 8 and 10, legs 28 are provided with openings 30 as described above.

Figure 6:
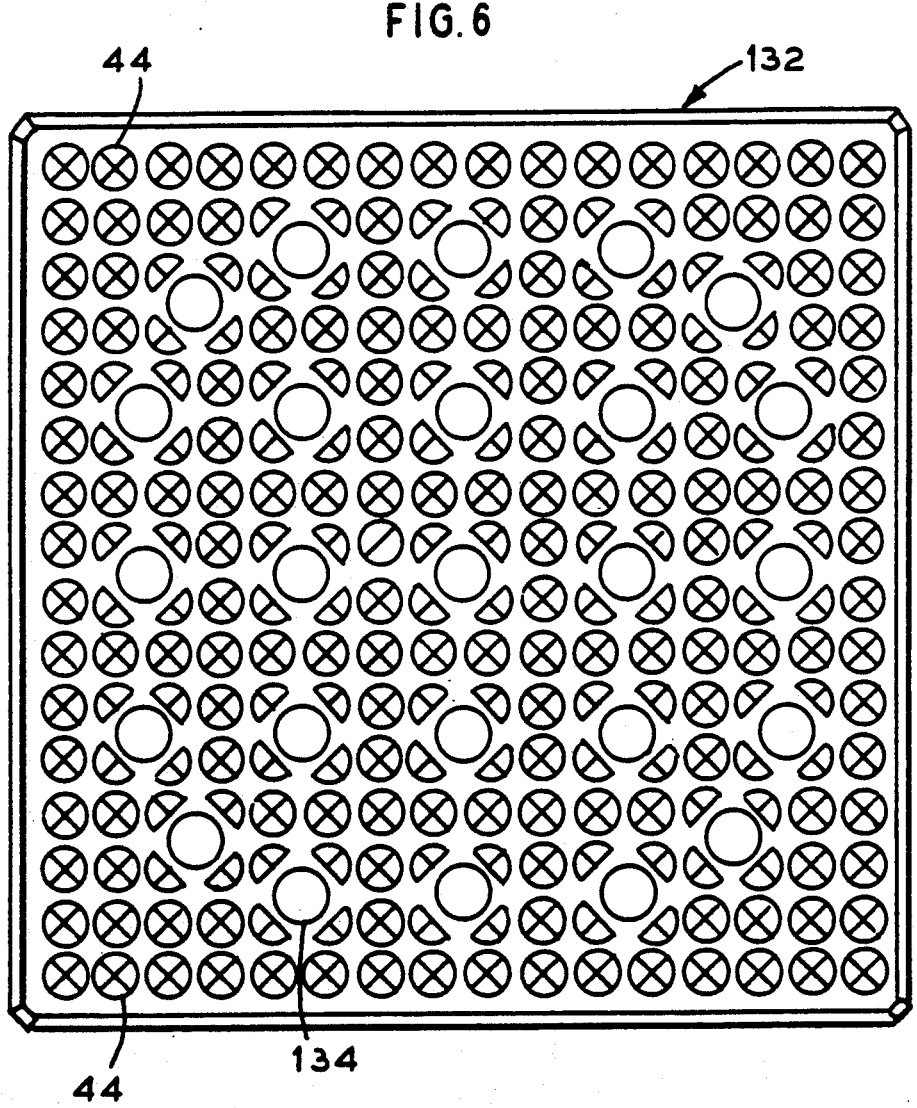
Figure 7:
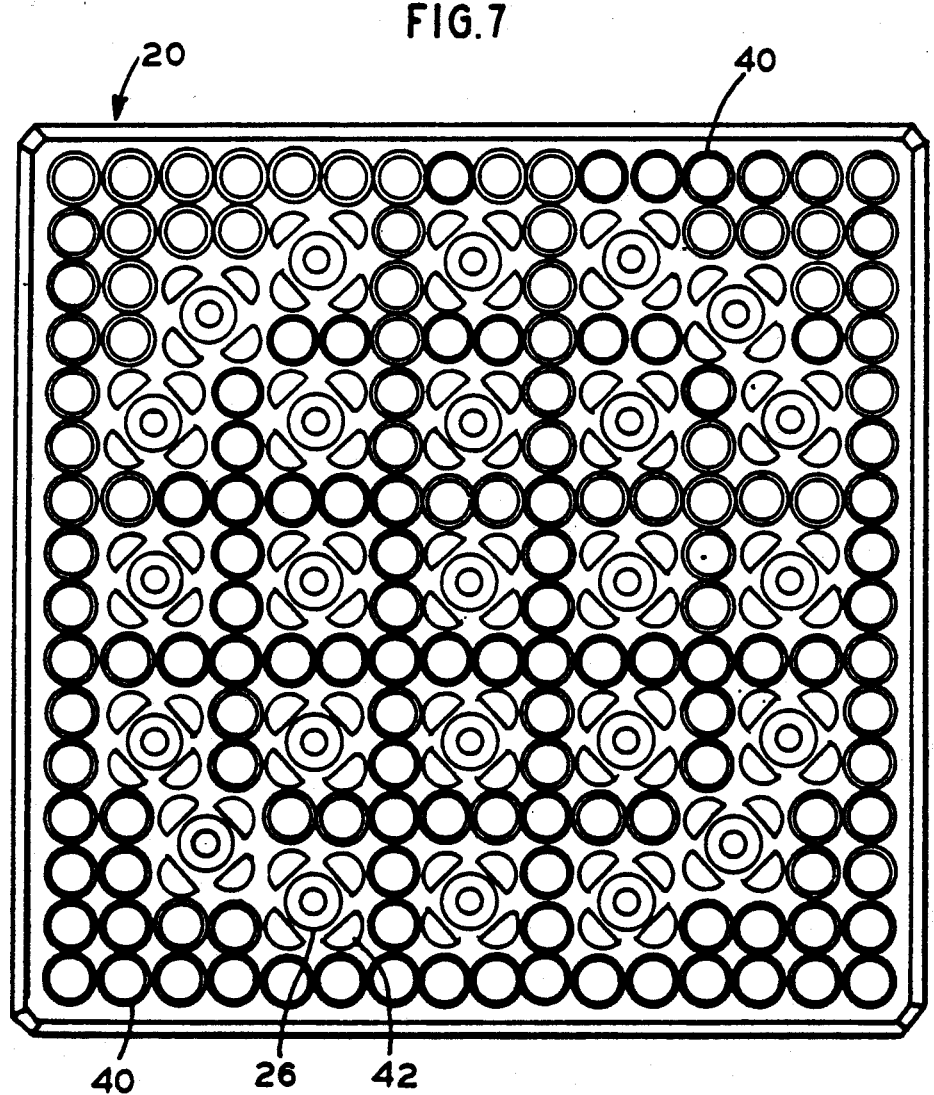
Figure 9:
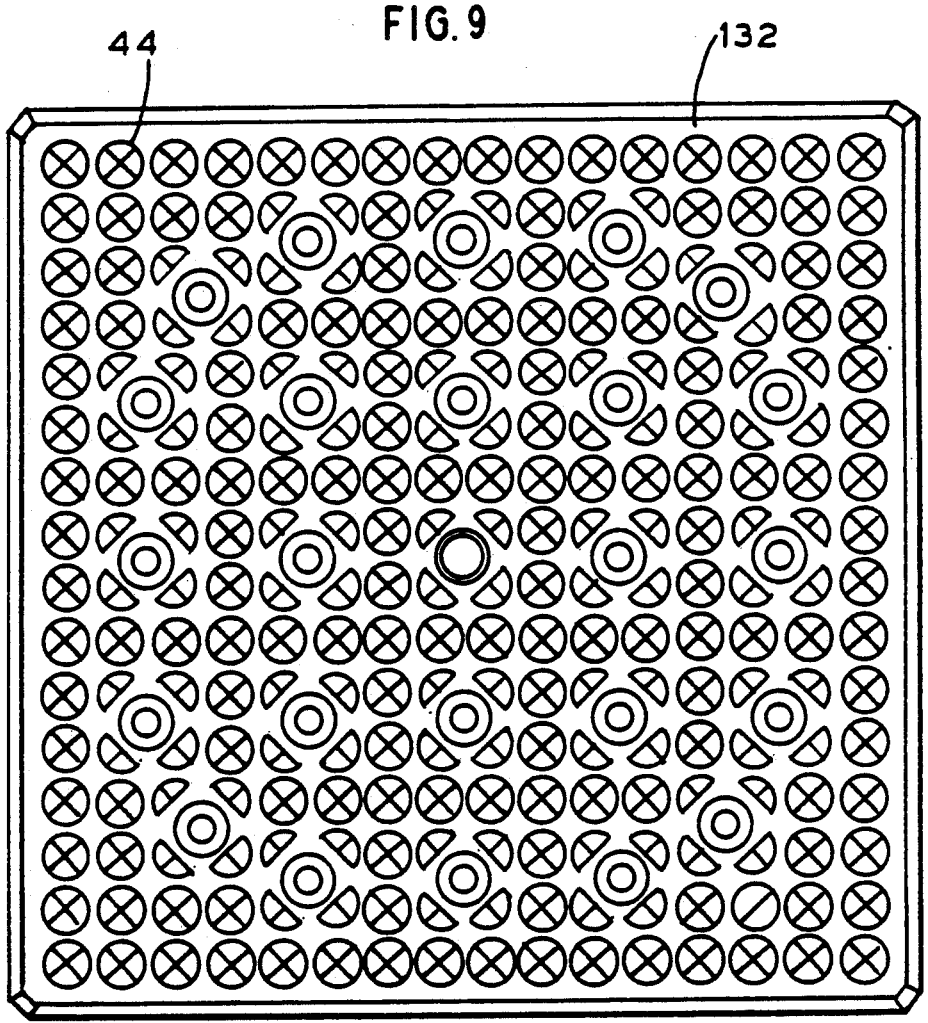
Figure 11:
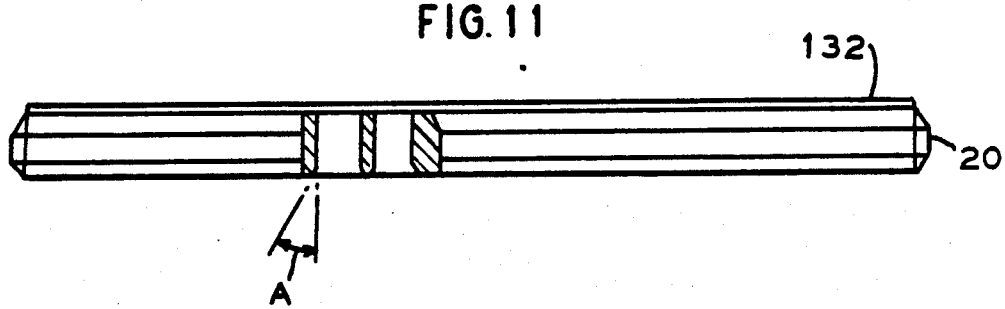

Debris filter 132, seen in the top view of FIG. 6, is also formed from a stamped plate approximately 0.1 inch thick and is provided with a plurality of flow holes 44. Flow holes 44 are substantially pie-shaped and arranged in circular clusters of four and in semicircular clusters of two around guide tube openings 134 in a pattern matching that of flow holes 40 in lower end fitting 20 (illustrated in FIG. 8). The portions of the plate or ligaments between flow holes 44 in each circular cluster are approximately 0.030 inch in width. This results in each pie-shaped quadrant having a diameter of approximately 0.181 inch with the circular cluster having a diameter equal to that of flow holes 40. The ligaments of the plate between the flow holes in each cluster are diagonally oriented relative to the sides of the plate. The diagonal orientation of the filter ligaments is such that the unblocked flow area, when considering the projected area of the fuel rods and the filter flow holes, is maximized. This minimizes pressure drop. The total flow area provided by debris filter 132 is thus approximately 22 square inches. As seen in FIG. 10, debris filter 132 is attached to the top of lower end fitting 20 by any suitable means such as welding. FIG. 9 illustrates a top view of debris filter 132 as it appears attached to lower end fitting 20.

Because many varying and differing embodiments may be made within the scope of the inventive concept taught herein and because many modifications may be made in the embodiment herein detailed in accordance with the descriptive requirement of the law, it is to be understood that the details herein are to be interpreted as illustrative and not in a limiting sense.

What is claimed as invention is:

1. In a nuclear fuel assembly having a plurality of fuel rods held in a spaced array by grid assemblies, guide tubes extending through the grid assemblies and attached at their upper and lower ends to an upper end fitting and a lower end fitting, the end fittings having openings therethrough for coolant flow, and a debris filter, the debris filter comprising:
   a. a plate attached to the top periphery of and spanning the lower end fitting; and
   b. said plate having a plurality of substantially pie-shaped flow holes therethrough that each measure approximately 0.181 inch in diameter with the majority of said pie-shaped flow holes arranged in groups of four to define circular clusters that each measure approximately 0.405 inch in diameter whereby the portions of said plate between said flow holes in each cluster are diagonally oriented relative to the sides of the plate.

* * * * *